United States Patent
Michel

(10) Patent No.: US 6,648,407 B1
(45) Date of Patent: Nov. 18, 2003

(54) DEVICE FOR CONVERTING SEATS INTO SLEEPER BERTHS, SEAT DESIGNED FOR SAID DEVICE AND TRANSPORT MEANS EQUIPPED THEREWITH

(75) Inventor: Dominique Michel, La Varenne Saint Hilaire (FR)

(73) Assignee: Adder S.A., Le Plessis Trévise (FR)

( * ) Notice: Subject to any disclaimer, the term of this patent is extended or adjusted under 35 U.S.C. 154(b) by 0 days.

(21) Appl. No.: 09/647,366

(22) PCT Filed: Mar. 29, 1999

(86) PCT No.: PCT/FR99/00721

§ 371 (c)(1),
(2), (4) Date: Nov. 21, 2000

(87) PCT Pub. No.: WO99/50089

PCT Pub. Date: Oct. 7, 1999

(30) Foreign Application Priority Data

Mar. 30, 1998 (FR) .............................................. 98 03900

(51) Int. Cl.[7] .............................................. A47C 13/00
(52) U.S. Cl. .......................... 297/62; 297/111; 297/236; 297/257
(58) Field of Search ............................ 5/9.1, 118, 37.1; 297/236, 257, 62, 234, 111

(56) References Cited

U.S. PATENT DOCUMENTS

| 2,775,996 | A | * | 1/1957 | Millar | ........................ 297/62 |
| 2,966,199 | A | | 12/1960 | Waerner | |
| 4,440,439 | A | | 4/1984 | Szabo | |
| 4,735,456 | A | | 4/1988 | Haefelfinger | |
| 5,358,306 | A | * | 10/1994 | Christensen | ................. 297/62 |

FOREIGN PATENT DOCUMENTS

WO  97 41000  11/1997

* cited by examiner

Primary Examiner—Anthony D. Barfield
(74) Attorney, Agent, or Firm—Lowe Hauptman Gilman & Berner LLP

(57) ABSTRACT

A system converting seats into couches, characterized in that it comprises—with at least one set of seats (1, 2) comprising at least one base (d) and one backrest (f) connected by a linkage (e) allowing to move said seat into the seating mode, the base and the backrest assuming a first relative angular position or into the couch mode, the base and the backrest then assuming a second relative angular position—a support (3) for said seats, a conversion mechanism driving each linkage of each seat to convert each seat (1, 2) into a couch in such manner that at least two consecutive seats within a column of the set of seats shall be moved from the seating mode one behind the other into the couch mode one above the other.

10 Claims, 12 Drawing Sheets

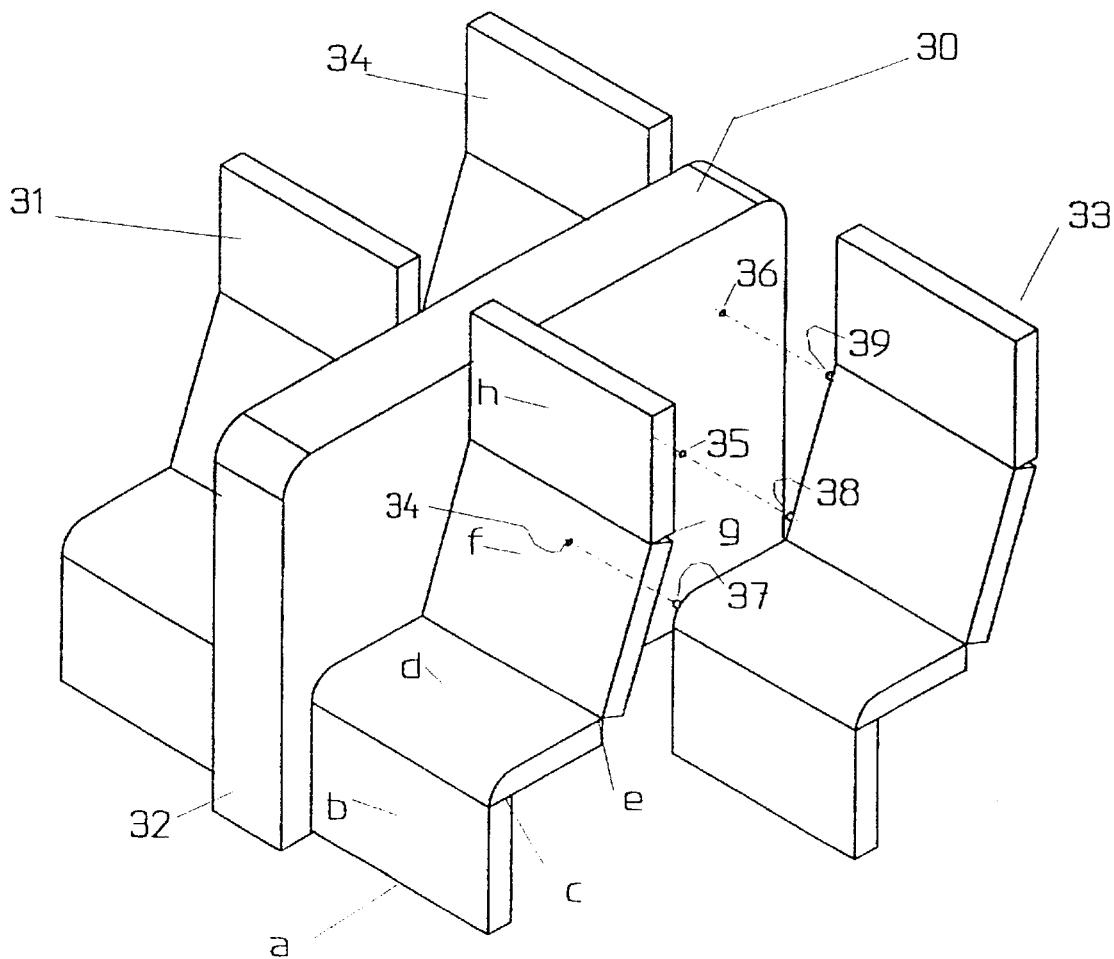

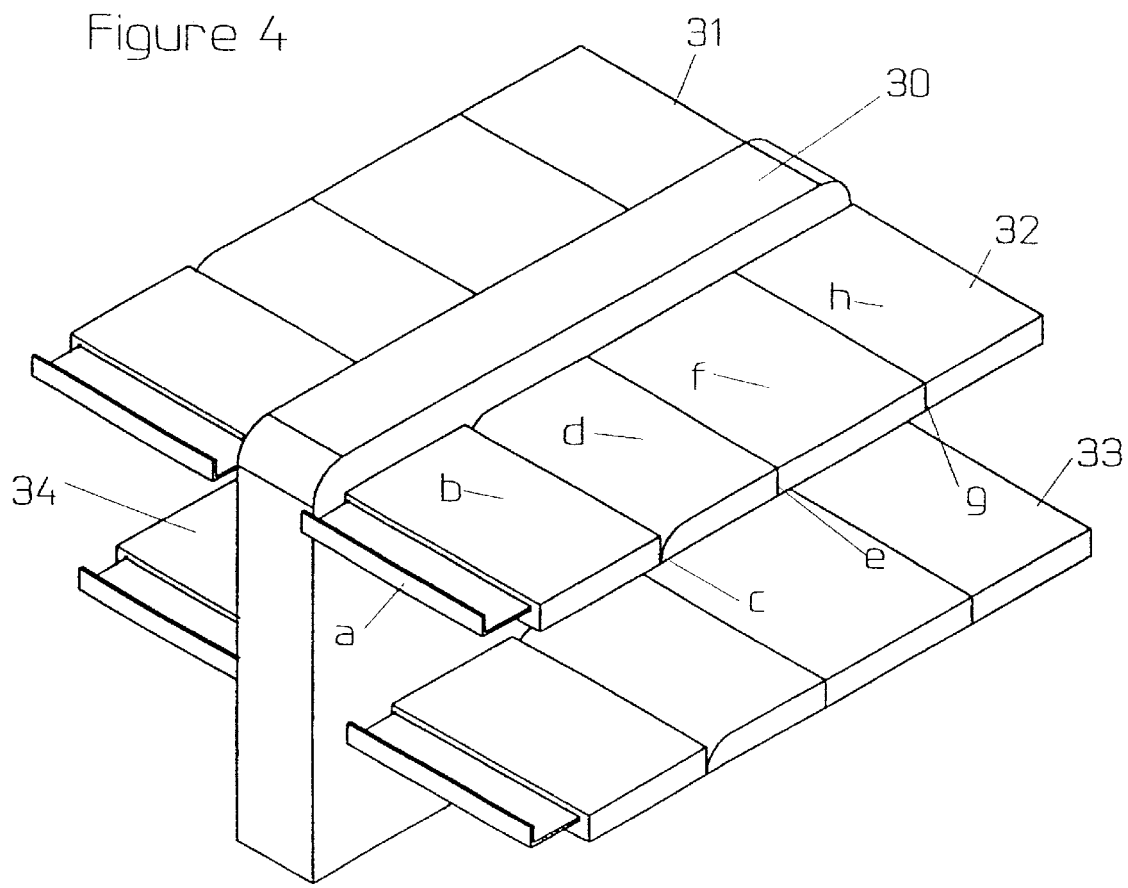

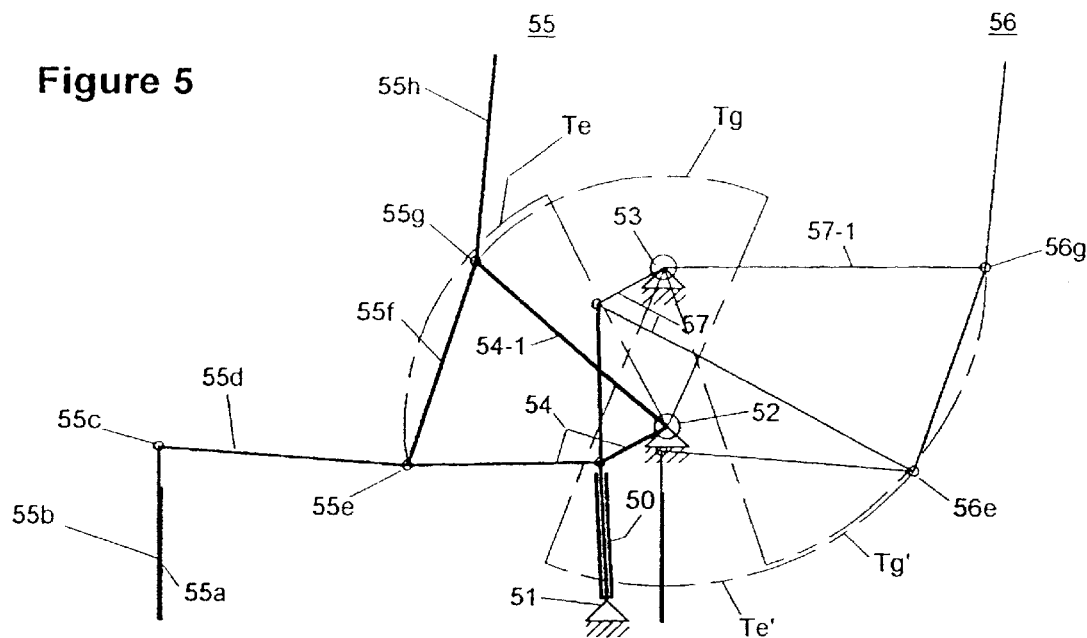

Figure 1:
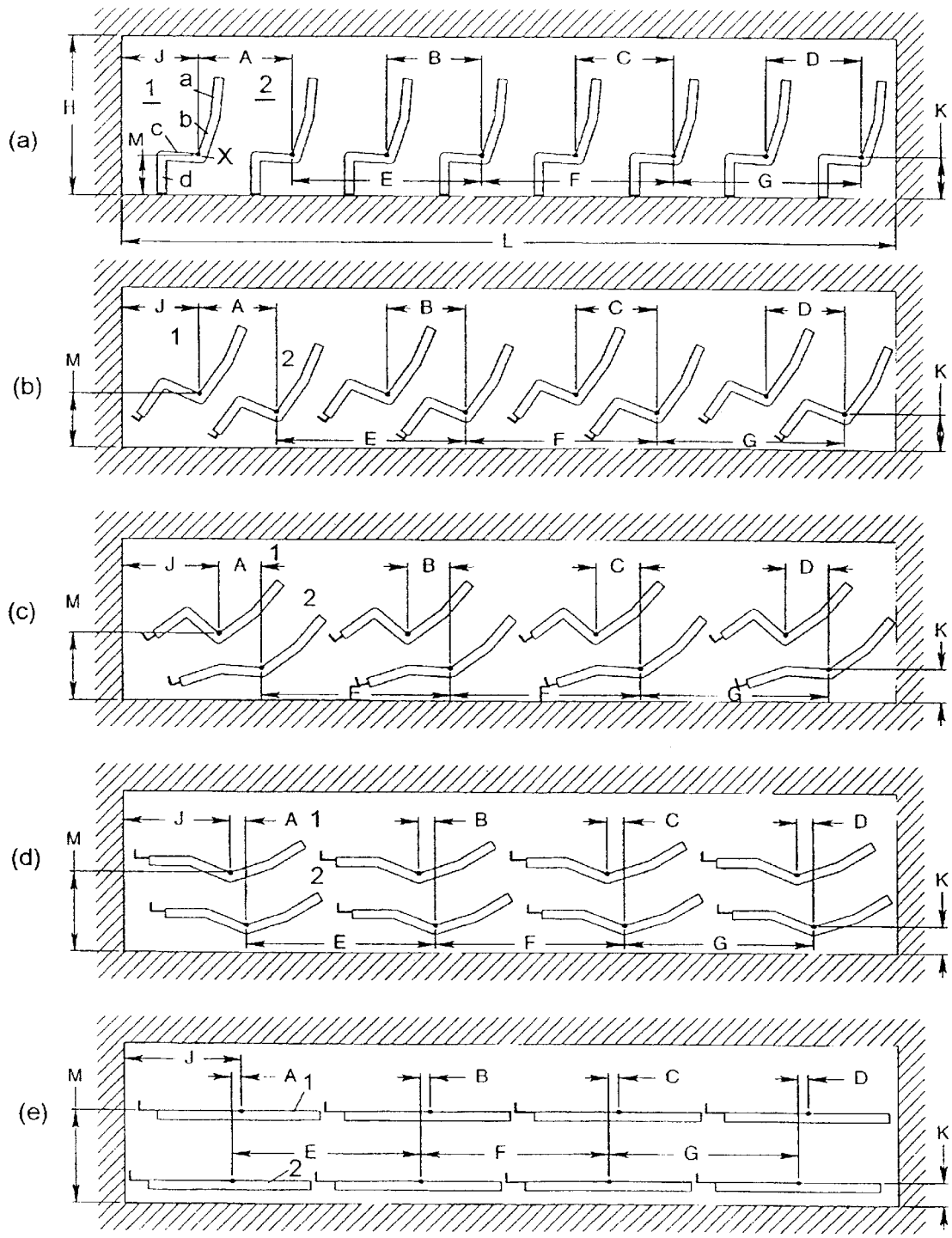

Figure 7
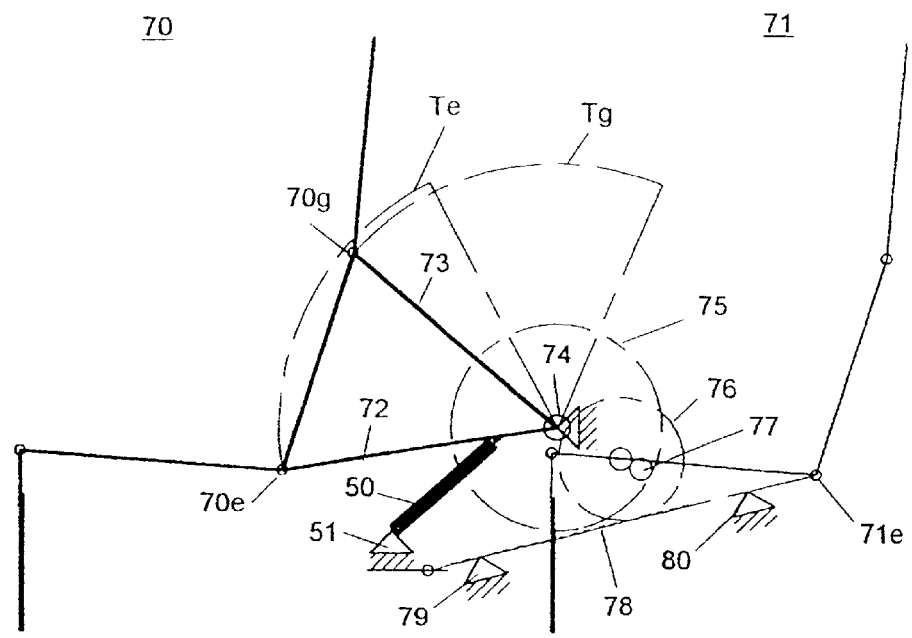
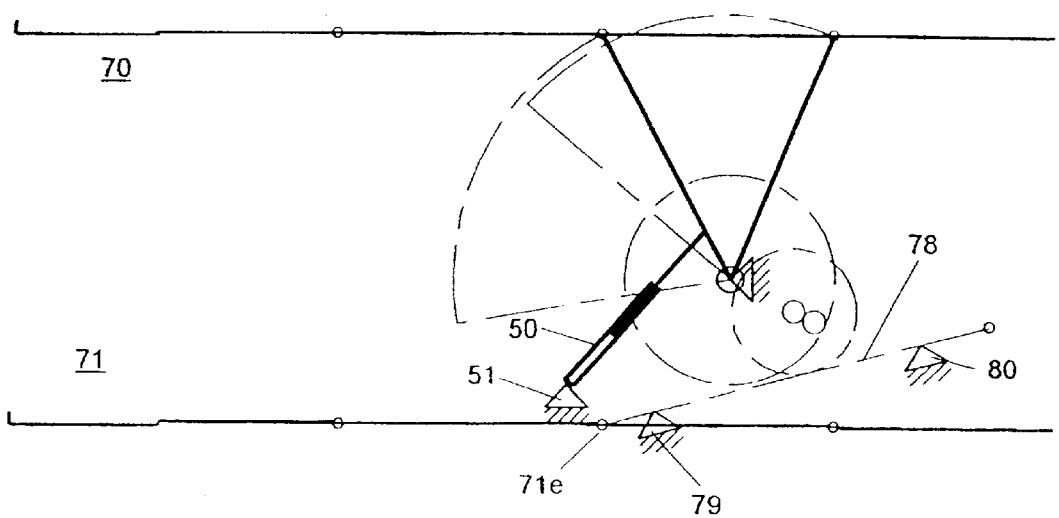
Figure 8

# DEVICE FOR CONVERTING SEATS INTO SLEEPER BERTHS, SEAT DESIGNED FOR SAID DEVICE AND TRANSPORT MEANS EQUIPPED THEREWITH

The present invention relates to a system converting seats into couches, in particular for sleeping, said system being particularly appropriate for long-distance passenger transportation in aircraft, trains, buses, ships of spacecraft. The invention also relates to a seat designed to be operational in such a system and to a passenger transport so equipped.

Proposals already have been made that are state of the art and aim at converting seats into couches. In particular two techniques are well known.

As regards the first technique, the seat parts such as the seat proper, hereafter the base, and the backrest, are disengaged from a frame and are bent in a manner to be substantially aligned within a plane when being mounted manually on another frame to form a couch. This state of the art cannot readily be used in practice when such a seat includes convenience features such as adjustable slopes of its various parts and in particular when its hinges are motor- or jack-driven.

As regards the second technique, it exploits the feature that the seat already is hinging and is motor or jack driven to extend it into a couch. However the conversion into couches with such driven seats is restricted, especially when an occupancy rate per unit volume is desired which is substantially the same whether the passengers be upright or prone.

As a result economic seat conversion nowadays is carried out manually while poorly meeting modern passenger comfort requirements both in the seat's upright and prone positions and advanced seat conversion is reserved to high-end seats and to a few places in the transport, in particular as regards aircraft.

The present invention remedies this state of the art: The present invention relates to a system converting seats into couches and in particular being characterized in that, at least for one set of seats, each seat shall comprise at least one base and one backrest which are connected in a way allowing using the seat in the upright sitting position, the base and the backrest subtending a first relative angular position, or using the seat as a couch, the base and the backrest subtending a second relative angular position, and further comprising a support for said seats, a conversion mechanism driving the linkages of each seat to convert it into a couch whereby at least two spatially consecutive seats of said set of seats shall be moved from their seating mode, one behind the other, into the couch mode one above the other.

In another object of the present invention, the said converting mechanism comprises at least one motor or jack driven by a control unit.

In another objective of the present invention, at least one part of each seat is fitted with linkages to housings or fasteners solidly affixed to the converting mechanism.

In still another object of the present invention, the converting mechanism comprises a rigid parallelogram for each seat of a set of seats and mounted on two stationary points affixed to a support or bulkhead, comprising a drive component connected to one of the stationary points and further at least one first lever of the said parallelogram of which one end is affixed to a seat part and the other end hinges about another stationary point, a second parallelogram being connected between the other stationary point and another seat part.

In another objective of the present invention, the rigid parallelograms of two consecutive seats are mutually symmetrical and are linked at appropriate points of their first levers by a connecting lever whereby a single drive component is configured jointly for said two consecutive seats and in such a way that during conversion the leading seat ascends whereas the trailing seat descends for their conversion into couches.

In another objective of the present invention, the converting mechanism cooperates with an attitude-changing mechanism of the seat, for instance changing a seat in the seating mode into a user relaxation mode, said mechanism comprising at least one drive component connected between a stationary point and a seat part, the seat attitude-changing mechanism comprising a lever hinging on another lever so as to be connected to the conversion mechanism.

In another objective of the invention, and with respect to two consecutive seats, the converting mechanism comprises a rigid parallelogram constituted by at least one stationary point and two levers hinging about said stationary point and of which the ends hinge in two distinct parts of a first seat, one point of one of the two parallelogram levers being fitted with a hinge on the end of a drive component of which the other end is firmly affixed to a second stationary point, the first stationary point bearing a shaft imparting rotation to at least one gear to transmit the converting motion, applied by the drive component, by means of a gear rack on which a part of the second seat is constrained to move.

In another objective of the present invention, the converting mechanism cooperates with a support or bulkhead and with means integrating the transfer mechanism and means protecting the passengers or users of the seats from the motions of the transfer mechanism of a set of seats.

In another objective of the present invention, the converting system for each seat comprises a stationary frame and a plurality of displaceable frames, further drive components to drive said frames relative to the fixed one, each part of each seat being associated with a displaceable frame in such a way that in a first mode, the seat parts are in a seating mode and in a second mode the seat parts are in a couch mode.

In another object of the present invention, at least one displaceable frame slides in a slide of the stationary frame along a predetermined path whereby the leading seat ascends to assume the upper couch mode and the trailing seat descends into the couch mode, this conversion motion being reversible.

In another object of the present invention, the stationary frame of a leading seat bears at least one stop to support the end of the legs or of the end of a seat in the functional upper couch mode and/or a tipping cam acting on the displaceable frame of a part of a seat that shall move into the upper couch mode, as a result of which a sequence of upper couches arrayed in a column shall constitute a rigid structure.

In another object of the present invention, the converting mechanism comprises at least one drive component actuated by a control unit and driving the displaceable frames of at least one seat relative to its stationary frames.

In another objective of the present invention, each stationary frame is firmly affixed to a stationary part, such as a leg of a seat, in the passenger space.

In another objective of the present invention, the seat of the invention comprises at least two parts each consisting of a support structure and of at least one cushion adapted to the user's body, said structure bearing at least one linkage to another seat part.

In another objective of the present invention, linkages for several seat parts cooperate with locking means in a seating mode and/or in a couch mode and/or in a reference state wherein the seat is mounted on the associated conversion mechanism.

In another objective of the invention, the seat comprises at least a foot-guard serving in particular to protect the head of the passenger in the leading seat converted into couch from the feet of the passenger in the trailing seat converted into a same-level couch.

In another objective of the present invention, the connection means is fitted with a motor or jack actuated by a control unit.

In another objective of the present invention, the connection means is linked by a displacement transmission to the conversion mechanism with which the seat is associated.

In another objective of the present invention, the transport, in particular for passengers, is fitted with seats and with at least one conversion means as claimed in one of the above claims.

In another objective of the present invention, the transport comprises at least one compartment fitted with at least one conversion means and with a column of associated seats and at least one of said areas may include at least one displaceable partition to accommodate the volume corresponding to said area when the conversion means is driven by its control unit.

The invention shall presently be elucidated in the following description and in relation to the attached Figures.

Figure 2:
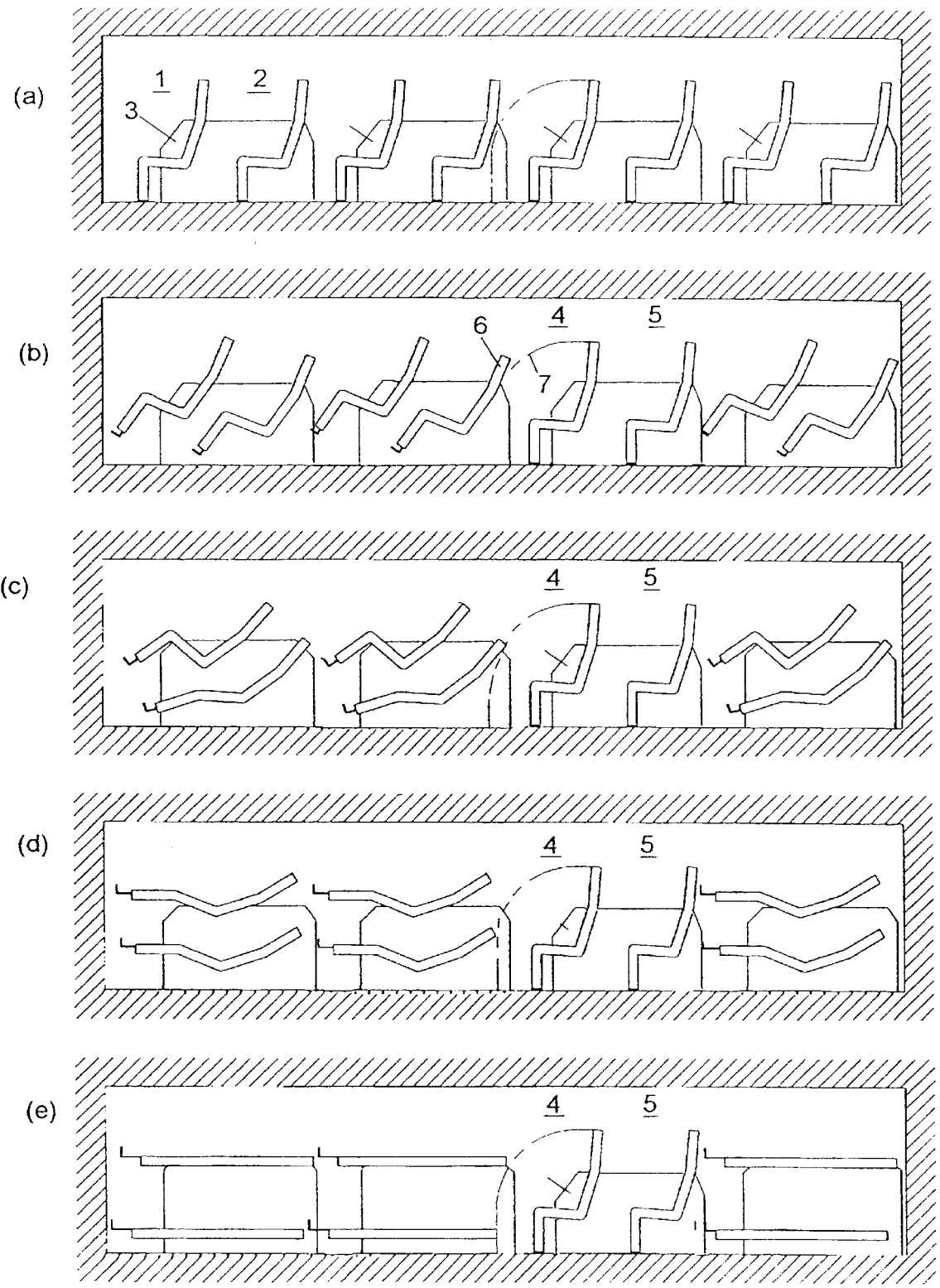
Figure 9:
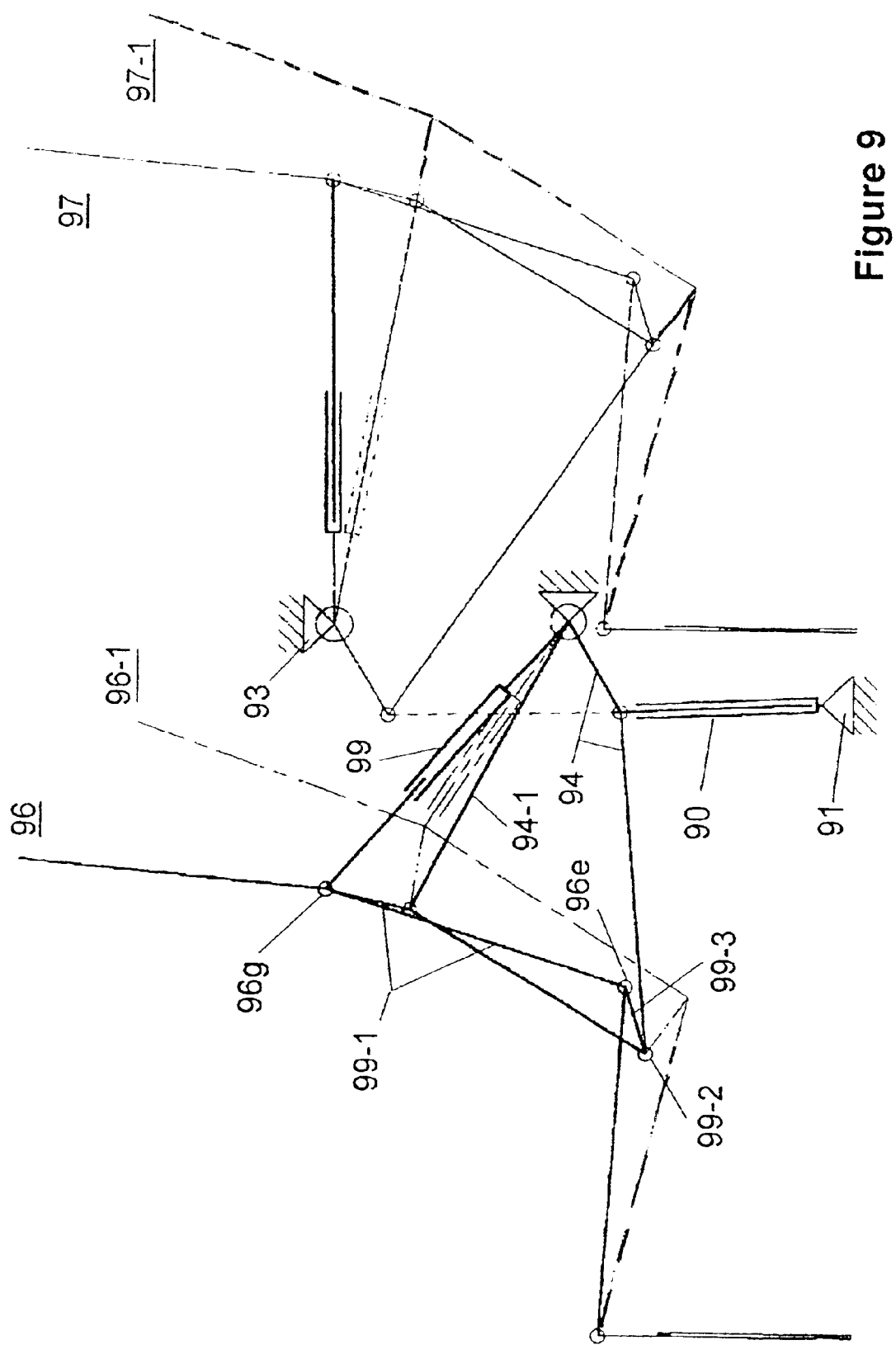
Figure 10:
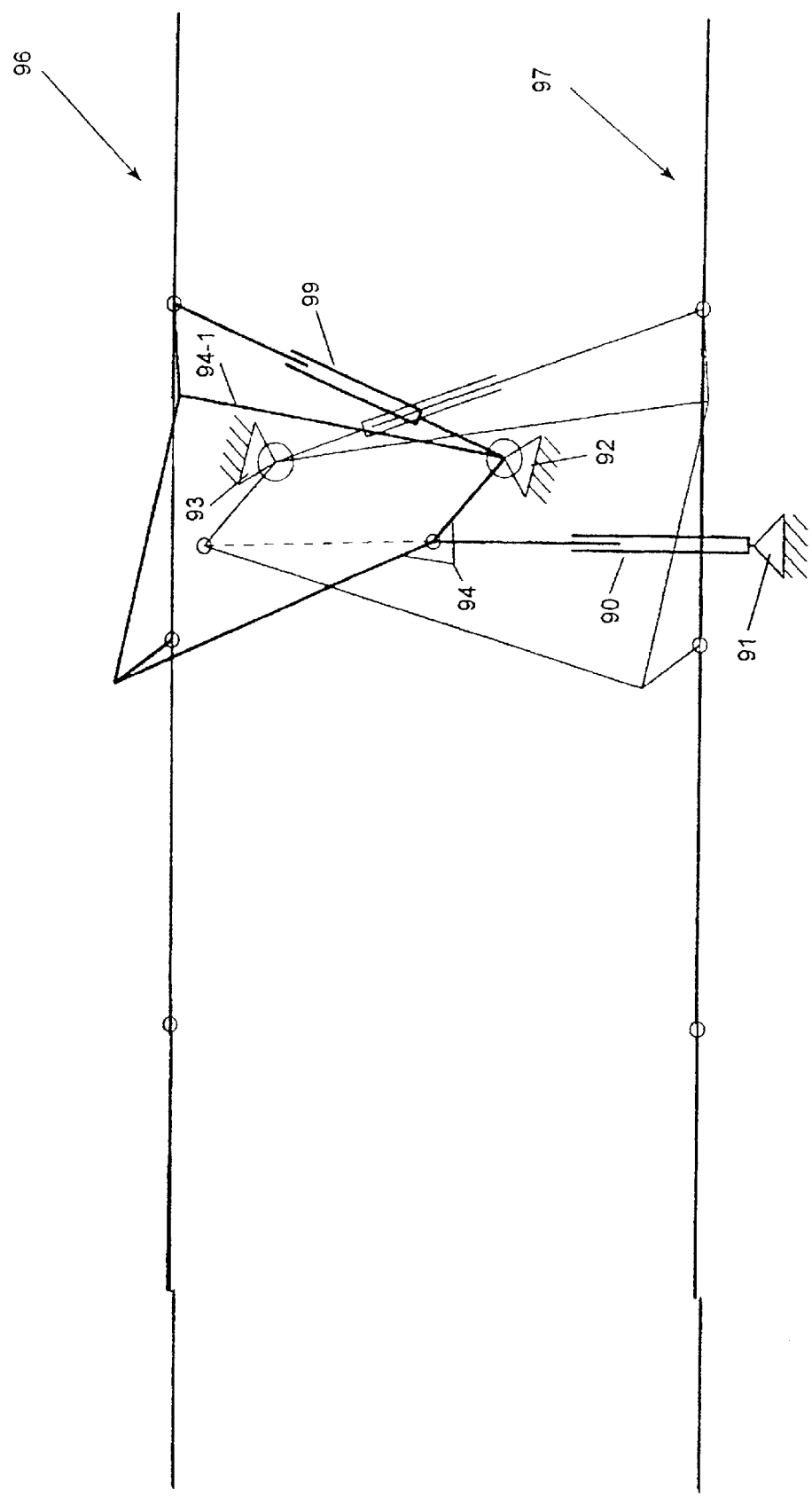
Figure 11:
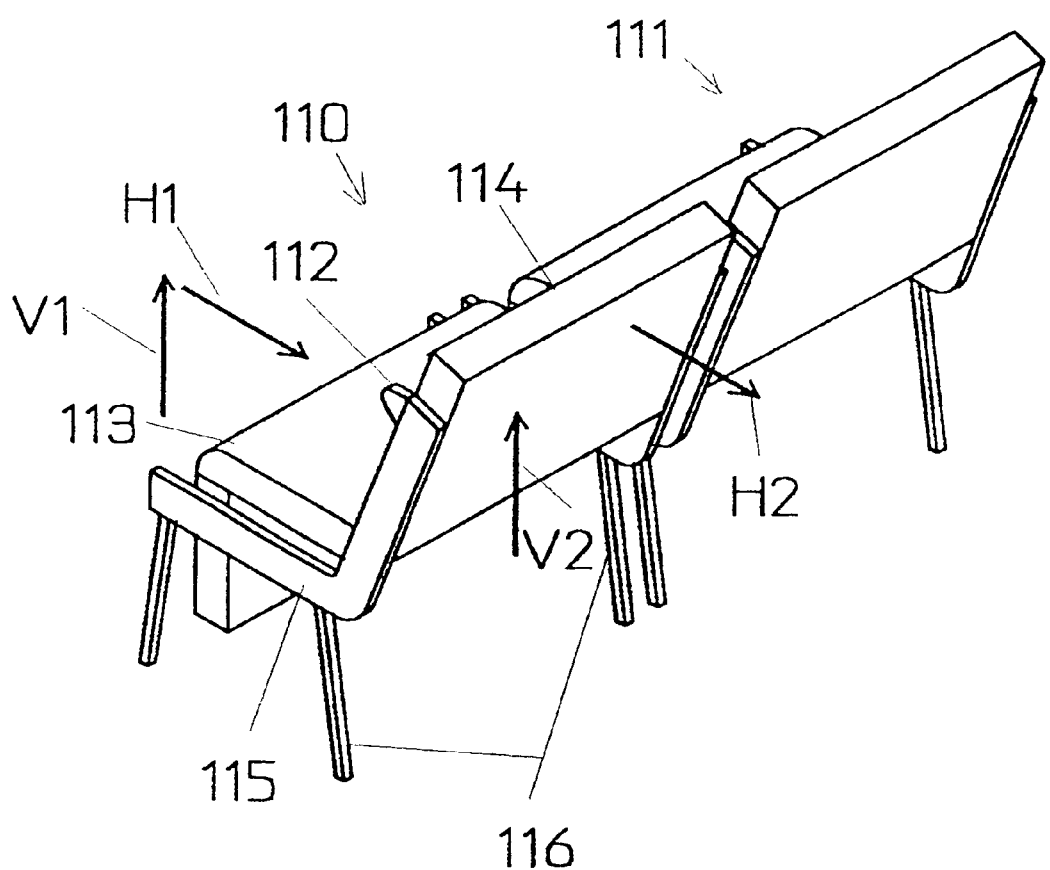
Figure 12:
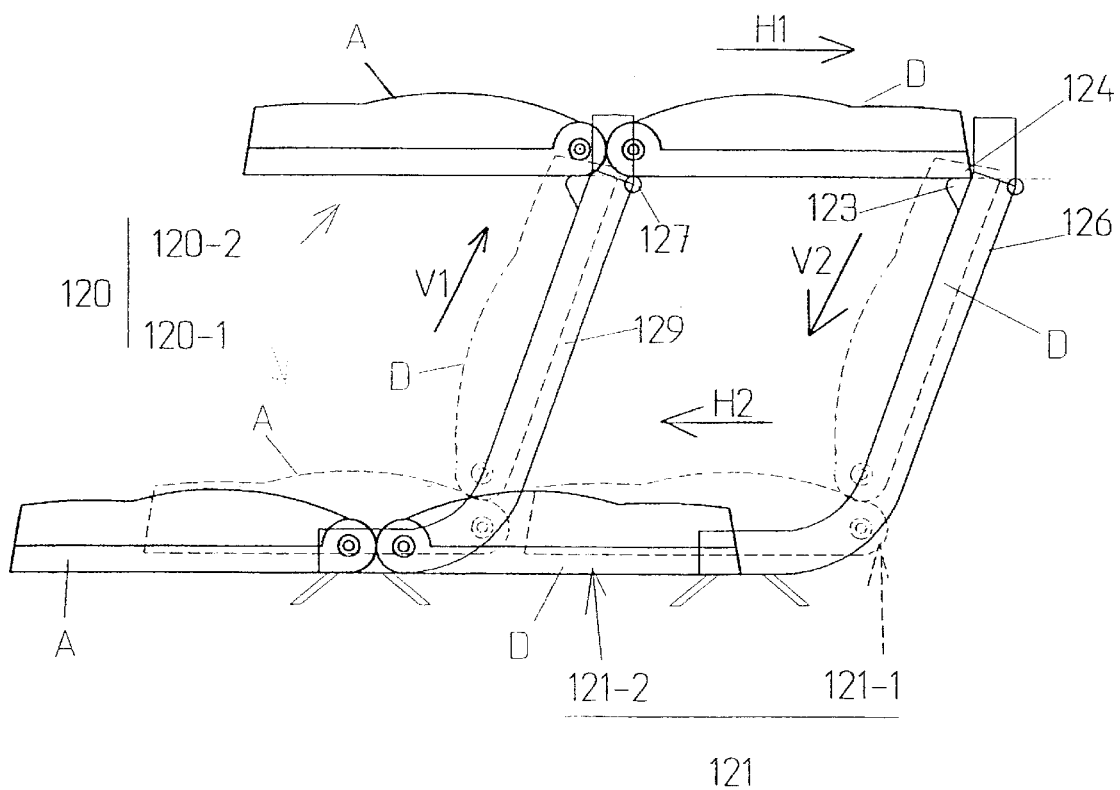
Figure 13:
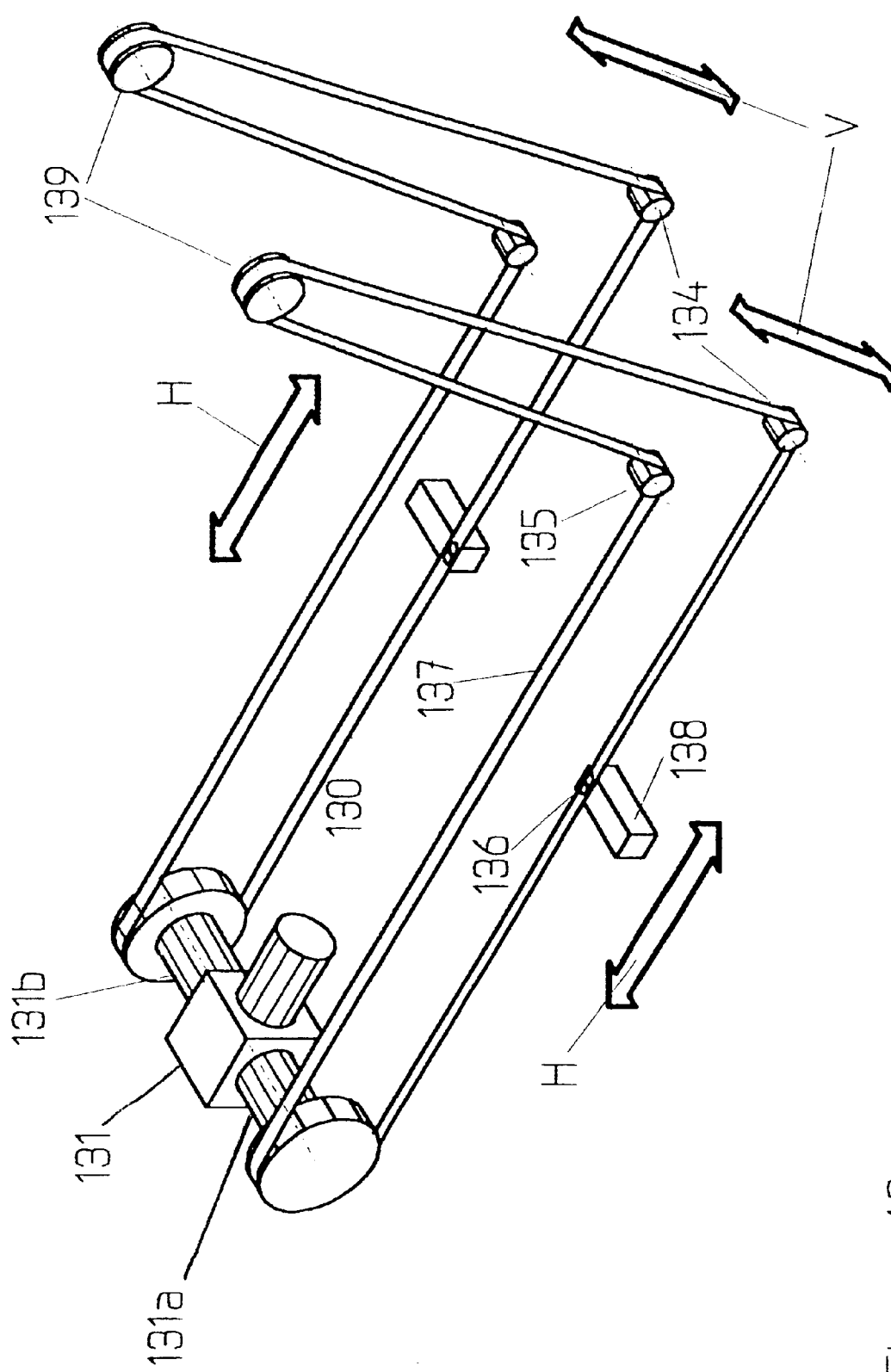
Figure 14:
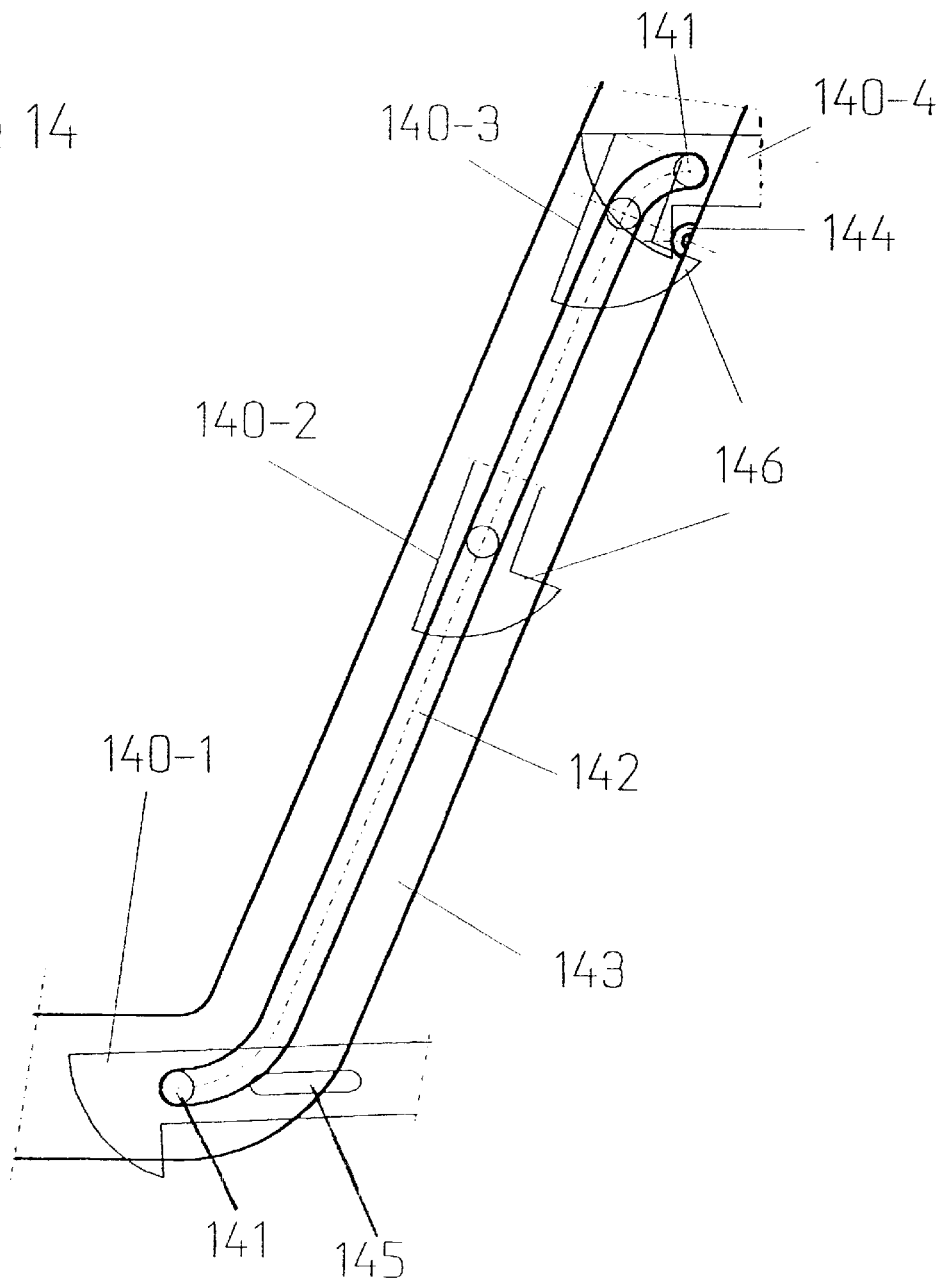

FIGS. 1, 2 are two schematic views of a first embodiment of the invention shown in different states of the means converting the seats into couches as indicated in the diagrams (a) through (e), FIG. 3 is a schematic perspective of a set of seats in the seating modes, one of the seats being in their assembly positions on a common bulkhead, FIG. 4 is a schematic perspective of the states of the parts of a pair of seats in the seating mode followed by the couch mode, showing the set of seats of FIG. 3 converted into couches, FIGS. 5, 6 are two schematic views of the states of the parts of a pair of seats in the seating mode and then in the couch mode and an embodiment of a conversion mechanism, FIGS. 7, 8 are two schematic views of a pair of seats in the seating mode and then in the couch mode fitted with another embodiment of a conversion mechanism, FIGS. 9, 10 are two schematic views of the parts of a pair of seats in the seating mode and then in the couch mode fitted with the first conversion mechanism cooperating with a means moving the seats into the user relaxation mode, FIG. 11 is a schematic perspective of a pair of seats in the seating mode fitted with another embodiment of the conversion means of the invention, FIG. 12 is a schematic view of the seat converting mechanism shown in sideview and in section at different states of two pairs of seats part of a column of seats, in the manner of the pair of seats of FIG. 11, and FIGS. 13, 14 are detailed views of parts of the seats and/or of the associated conversion mechanism of the pair of seats of FIGS. 11 and 12.

FIG. 1 shows a functional diagram of a system converting seats into couches.

FIG. 1 shows a set of seats 1, 2 in a compartment of length L and height H. In diagram (a), the set of seats consists of a column of seats when the conversion system of the invention has moved them into the seating mode. In diagram (e), the set of seats was converted pairwise into couches, the diagrams (b) through (d) showing the intermediary stages when passing from the seating mode (diagram a) to the couch mode (diagram e).

The seats are identical and each comprises, seen from bottom to top: a foot guard a, a leg rest b, a base d, a backrest f and a head rest h which are joined by hinge means that shall be elucidated farther below.

The volume of the compartment subtended in this manner in particular is bounded by a floor and ceiling between which are configured the seats which are horizontally arrayed in a column at distance A through G between a reference point X (which is only shown on seat 1 but situated in each seat at the intersection of the base d and the backrest f). In the seating mode, the reference point X is situated at a height K or M from the floor.

In the embodiment of FIG. 1, the set of seats in this compartment consists of four sub-sets of two seats each in such manner that each pair of seats is interconnected. This sub-set of two consecutive seats takes up a space of length E, F or G in a way that the trailing seat is located a distance A, B, C or D from its leading seat. The leading seat 1 of the first sub-set 1, 2 is a distance J from the front wall (on the left of the compartment.

Especially when the volume L×H is small, for instance in an aircraft, the basic problem of the invention is that the conversion of such seats into couches is non-obvious: Desirably the conversion should take place while the passengers are seated, during the transportation phase, without entailing changes in the occupied volume, and without the seats bumping into each other while being converted.

The seats shown here comprise more than two base and backrest parts d and f respectively. They also comprise a headrest h and a leg rest b. The various seat parts are connected by a linkage (omitted for clarity from FIG. 1) which sets their diverse and mutual angular positions in either seating or couch mode.

It is understood that other seats may be configured in the direction perpendicular to FIG. 1, whereby several seats are arrayed side-by-side and in known manner, being separated by an aisle to allow passenger traffic. Other sets of seats of this kind of configuration may be fitted into the transport compartment at different levels between a similar local floor and ceiling.

In the invention, each pair of seats in each column is thus combined with a conversion mechanism mounted on a local support means, this local support means and the conversion mechanism then being aggregated within the apparatus of the invention with control means which, upon actuation by the flight personnel, may convert a set of seats into couches, or also all the seats of this design. The said seats and conversion mechanism are designed to preclude improper interaction between the seats and their occupants.

As regards the diagram (a) of FIG. 1, the conversion mechanism acting on two consecutive seats is linked to the various linkages of the constituent parts of each seat of the pair of seats forming a sub-set of seats. For that purpose levers or slides that shall be elucidated farther below as well as other means in the form of drive components are configured in such manner that the pair of seats consisting of a leading seat 1 and trailing seat 2 shall be converted into a pair of couches situated one above the other as shown in the diagrams (a) through (e).

Accordingly the conversion mechanism implements an ascent of the leading seat 1 relative to its preceding position and hence relative to the trailing seat 2. At the same time the trailing seat 2 is made to progressively slide underneath the leading seat 1. As a result and as shown in diagram (b), each trailing seat 2 of the pairs of seats in the column is sloping and made to slide underneath the leading seat 1 of each pair; each leading seat 1 ascends above the trailing seat 2. The intermediate positions are not dwelt on, because only being assumed by the seats during a continuous and reversible motion from the seating mode (diagram a) to the couch mode (diagram e).

Diagram 1(e) shows the final state of the conversion into couches, the pairs of seats, with respect to the leading seat 1, having been changed into the upper couch, and with respect to trailing seat 2 into the lower couch.

Be it borne in mind that the seats and the motions of each conversion mechanism are designed in such manner that the couches occupy the same compartment volume as when they were seats, and this feature is made possible by the ascents of the leading seat 10 in each pair of seats of a column of seats.

As regards a main feature, of the seat of the invention, the various seat parts are affixed to one another using known linkages such as hinges and/or slides. Each linkage may include a locking means so that, even with a passenger being seated, the two seat parts connected by the linkage and its actuated lock shall remain in their relative position as long as the conversion mechanism and/or a specific mechanism changing the seat attitude—such as a release mechanism that shall be described in relation to a particular embodiment—will not have been actuated by its control unit.

In a main embodiment of the transport of the invention, it comprises at least one compartment of which the volume taken up in either of the seating and couch modes may vary. In that case the compartment volume either can be modified by moving at least one of the partitions by driving the conversion system into either the seating or the couch mode, said displaceable wall cooperating with a wall mover of which no further mention shall be made herein, or it can determined by the maximum volumes taken up by the seats in the seating or couch modes.

FIG. 2 shows the system of the invention of the embodiment of FIG. 1 when a pair of consecutive seats for any reason (malfunction, wish to remain in the seating mode) cannot be converted into a pair of superposed couches, or in the reverse situation whereby the pair of couches cannot be converted into the seating modes.

Each pair of consecutive seats is mounted on a support or bulkhead illustratively firmly affixed to the floor of the compartment, such as the bulkhead 3 at the first pair of seats 1 and 2 at the left of the Figure, in diagram (a). It is understood that each pair of seats in each mode of the conversion system (and therefore in each diagram) in any circumstance (hence in FIG. 1 or FIG. 2) is mounted to a support or bulkhead 3. Preferably the reference point X and the linkage of the hinges of the seat parts are mechanically connected to the bulkhead 3 by motion transmissions of the integrated conversion mechanism which is protected by the bulkhead, and by the mechanism on which is mounted the seat, as a result of which—when the omitted control unit issues a command to convert to the bulkhead 3—the bulkhead 3 drives the various linkages to position the pairs of seats of the diagram (a) into pairs of superposed couches shown in diagram (e), or to implement the reverse conversion from the couch mode into the seating mode.

If however one of the pairs of seats 4 and 5 for the above reason or another were disengaged from the conversion system, said pair shall be situated within a protective volume 7 which is subtended both by the configuration of each seat's parts and by the path imparted to them by the conversion system, so that the passenger and the seat shall be sheltered from the interactions of the other seats.

Be it noted with respect to FIGS. 1 and 2 that each seat comprises at least two parts and must include at least one base (d in FIG. 1, diagram a) and one backrest (f in FIG. 1, diagram a).

In particular the leg rest b hinging on the corresponding edge of the base d cooperates with a foot guard a which progressively translates forward from omitted slides in the leg rest b when moving from the seating mode (diagram a in FIGS. 1 and 2) into the couch mode (diagrams e of FIGS. 1 and 2). A particular function of the foot guard is to protect the head of prone person in the couch in front of the foot guard of the following couch from the feet of the person behind. In the manner schematically shown in the drawings, the foot guard a comprises a first element sliding in slides of its linkage in or along the part b of the following seat and a second element substantially perpendicular to the first element and on which rest the feet of the passenger in the seat.

FIG. 3 is a schematic perspective of a set of seats in the seating mode with one of them in the mounted position on a common bulkhead. The bulkhead 30 is affixed by appropriate means to a support structure such as that supporting the floor of the compartment. The bulkhead 30 holds in integrated manner and protects the conversion mechanism of two parallel sets of two consecutive seats, namely the leading seats 31 and 32 and the trailing leads 33 and 34. The conversion mechanism 30 integrated into and protected by the bulkhead 30 allows raising the two leading seats into high couches as shown in FIG. 4 and moving the two trailing seats into low couches as seen in FIG. 4 in the manner of the consecutive stages shown in the above FIGS. 1 and 2.

The conversion mechanism mainly consists of electric drive components and levers and/or gears and/or gear racks of which the motions are shielded from the interactions with the passenger by means of the bulkhead of which such is the purpose. The various designs of the conversion mechanisms are shown in the Figures below.

Each seat in the embodiment of FIG. 3 is composed of parts referenced a through h as already discussed above in relation to FIGS. 1 and 2, as a result of which the linkages c, e and g interconnect the various seat parts. Each seat part mainly consists of a cushion matching human body contour, and its structure assures supporting the passenger in the seat as well as the assembly of the linkages (denoted c, e and g) already described.

The structures integrated into the cushions of the base d and the backrest f are fitted with spindles 37 on the base d and 38 and 39 on the backrest f. Each spindle 37, 38 and 39 is removably mounted in a housing 34', 35 or 36 situated in segments of the bulkhead 30 which are firmly affixed to the conversion mechanism integrated and protected therein, and together they constitute linkages to housings or fasteners solidly joined to the conversion mechanism.

Two configurations are applicable to mount them onto the bulkhead:

in a first configuration, the linkages c, e and g are detachable in the sense they allow disengaging each seat part from its neighbor; in this first configuration, the base d and the backrest f are independently mounted on the bulkhead as indicated in dashed lines in FIG. 3 and the various linkages of the siege parts then are combined, in a second configuration of the invention, the linkages remain joined to the various seat parts; the linkages are fitted with means locking them in a reference position of the seat parts in such manner that when the conversion mechanism integrated in and protected by the bulkhead 30 is in the seating mode, the seat 33 may be represented by its assembly spindles 37 through 39 in the housings 34' through 36 in the bulkhead.

In this feature of the invention, one or several of the seats in question are easily detached to allow access to the bulkhead or to clean or repair each seat.

Be it borne in mind that arm rests are not shown in this embodiment because the present invention is not restricted to such a feature.

It is noted that the bulkhead 30 constitutes a partition between two side-by-side chairs such as 31 and 32 or 33 and 34. Within the constraints of manufacturing the, conversion mechanism, it is clear that the size of the bulkhead 30 may be reduced in such a way as to eliminate the separation between two side-by-side seats.

FIG. 4 shows a schematic perspective of the set of seats of FIG. 3 when converted into couches. The same components are denoted by the same references and shall not be described again. In a preferred embodiment mode, couch rigidity is assured by actuating locking means which are associated on one hand with the linkages between the various seat parts and on the other hand between the particular linkages and the conversion mechanism.

FIGS. 5 and 6 show a first embodiment of a conversion mechanism for converting seats into couches, wherein a single drive component 50 allows driving synchronously the two seats without danger of interference.

In this embodiment mode, the support—omitted in FIG. 5—of the conversion mechanism comprises three stationary points associated with hinges pivoting about these stationary points, namely a first stationary point 51 hinging on a first end of a jack constituting the drive component 50 of the conversion mechanism, a second, stationary point 52 hinging about a first end of a first lever 54 associated with the leading seat 55, a third stationary point 53 hinging on a first end of a first lever 57 associated with the trailing seat 56.

As in FIGS. 1 through 4, the components of the leading seat 55 are denoted by a through h in the order of connection of the foot guard 55*a* to the head rest 55*h*, said components comprising in particular a hinge 55*e* jointly used by the seat 55*d* and backrest 55*f* and solidly affixed to a second end of the first, elbow-shaped lever 54, a hinge 55*g* jointly used by the backrest 55*f* and the head rest 55*h* and being firmly affixed to a first end of a second lever 54-1.

The other ends of the first and second levers 54 and 54-1 resp. are connected by appropriate hinge means in order to constitute together with the backrest 55*f* a rigid parallelogram depending on the position of the jack 50 of which a second end is firmly affixed to an appropriate point of the first, elbow-shaped lever 54.

The trailing seat 56 is configured identically to the leading seat 55 and also comprises a rigid parallelogram constituted of levers 57 and 57-1 and of the backrest 57*f*.

The parallelogram of the two seats are linked by a bar 58 of which the ends connect respectively the hinge situated at an appropriate point of the first lever 54 as regards the parallelogram of the seat 55, the hinge situated at an appropriate point of the first lever 57 as regards the parallelogram of the seat 56.

The other end of the first lever 54 of the leading seat 55 is connected to a hinge situated at the second stationary point 52 which is firmly affixed to the omitted support. As regards the trailing seat 56, the other end of the first lever 57 is connected to a hinge situated at the third stationary point 53 which is solidly joined to the omitted support.

In this design, the displacement caused by the jack 50 mounted between the stationary point 51 and the hinge located at an appropriate point of the first lever 54 for the parallelogram of the seat 55 also is applied to pivoting the first lever 57 at an appropriate point as regards the parallelogram of the seat 56. As a result the conversion displacements of the two seats are synchronized and controlled by a single drive component.

When, following a command from the (omitted) control unit of the conversion system, the drive component 50 becomes active, the hinges 55*g* and 55*e* of the seat 55 are constrained to move along circles shown in broken lines Te and Tg while the hinges 56*g* and 56*e* of the seat 56 are constrained to move along circles shown in broken lines Te' and Tg', and each seat passes from the seating mode (FIG. 5) to the couch mode (FIG. 6). Because the conversion parallelograms are situated at the rear as regards the seat 55 and at the front as regards the seat 56, the seat 55 will rise when being converted into a couch whereas the seat 56 will descend when being converted into a couch.

The components of the conversion mechanism driving the other parts of the seat 55 or 56 are indicated merely in schematic manner in order not to clutter the Figure. They are shown in FIG. 6 for the seat 55. In this preferred embodiment, these conversion mechanism components also act as linkages between the various seat components, but their drive components are connected to control means which cooperate with the control unit driving the conversion mechanism of the invention.

The foot guard 55*a* is mounted on at least one slide and is driven into translation by a drive component Ma relative to the leg rest 55*b*.

The leg rest 55*b* hinged on the base 55*d* by means of a hinge 55*c* is driven in rotation relative to the base 55*d* by a drive component Mc.

The base 55*d* hinged on the backrest 55*f* by means of a hinge 55*e* is driven in rotation relative to the backrest 55*f* by a drive component Me.

The head rest 55*h* hinged on the backrest 55*f* by means of a hinge 55*g* is driven in rotation relative to the backrest 55*f* by a drive component Mg.

In a first embodiment, the various drive components Ma, Mc, Me and Mg are levers driven by the drive component 50.

In a second embodiment, the various drive components Ma, Mc, Me and Mg are electric motors of which the control is synchronized with that of the drive component 50.

Accordingly, using the various drive components described in relation to FIGS. 5 and 6, the couch may be implemented in planar form (FIG. 6) or like a hammock (omitted), the various seats subtending ergonomic couch angles of predetermined configurations.

FIGS. 7 and 8 show another embodiment of a mechanism for converting seats into couches.

The drive component 50 hinged on a stationary point 51 is firmly affixed to the mechanism support similar to that of the previous Figures. It drives two levers 72 and 73 of which two ends hinge on a common pivot 74 which is mounted on a stationary support point. The two levers are mutually rigid and their far ends are linked to the above described hinges e and g of the leading seat which in this instance is denoted by 70.

A gear 75 is fitted with a shaft affixed to the hinge 74 and is driven into rotation by the jack of the drive component 50.

The gear 74 meshes—by means of a displacement amplifying mechanism comprising rollers 77—with a gear 76 of which the external peripheral teeth (omitted) engage an inclined gear rack 78 mounted on two stationary points 79 and 80 firmly affixed to the conversion mechanism support.

Similarly to the hinge 56e of the seat 56 of FIG. 5, the hinge 71e of the trailing seat 71 is constrained to move along the gear rack 78 whereby the trailing seat 71 slides underneath the leading seat 70 without interfering with it during its synchronized ascent motion.

The other seat parts are fitted with (omitted) drive components already described in relation to FIGS. 5 and 6. Be it noted that some these parts may comprise the same gear and gear rack mechanism as described above to drive the trailing seat 71.

FIGS. 9 and 10 show a third embodiment mode of a conversion mechanism of the invention. The leading seats 96 and the trailing seats 97 are identical with the seats of the previous Figures and the various seat parts are unreferenced. In the same manner as shown in the embodiment of FIGS. 5 and 6, the conversion mechanism comprises three stationary points 91 fastening the jack 90, and 92 and 93 to connect the parallelograms of the components of the conversion mechanism which are associated with the seat 96 or 97. The parallelograms of the embodiment of FIGS. 5 and 6 and formed on the first and second levers 94 and 94-1 are the same in this embodiment but an additional mechanism with a jack 99 is also introduced in order to provide an attitude-changing mechanism of the seat, for instance to assume a passenger relaxation position shown in broken lines 96-1.

The seat in the normal seating mode is shown by the solid lines of FIG. 9 and if the jack 90 is actuated, with the jack 99 being inert, the seat maybe converted into a couch as shown in FIG. 10 in identical manner with that described for the conversion mechanism discussed in relation to FIGS. 5 and 6.

From the position shown in solid lines in FIG. 9, the seat 96 can be moved into the passenger relaxation position 96-1 provided the jack 99 is shortened: A first end of the jack 99 is firmly joined to the stationary point 92 associated with the seat 96. A second end of the jack 99 is firmly joined to the hinge 96g between the backrest and the head rest of the seat 96. The other end of the elbow lever 99-1 bears a hinge 99-2 which is also mounted on the corresponding end of the first lever 94 of the already described conversion mechanism (see lever 54 of FIG. 5).

The hinge 99-2 is linked by a lever 99-3 to the hinge 96e between the base and the backrest of the seat 96. When—upon a command from a control unit to move into the relaxed position—the jack 99 is shortened, said jack rotates about the stationary point 92 and, because the conversion mechanism is locked in the "seating" position, the lever 99-3 rotates about the hinge 99-2, as a result of which the seat tips into the relaxation position 96-1.

To convert the seat 96 into a couch in the course of the joint motion with the trailing seat 97 which already was described in relation to FIGS. 5 and 6 for the similar seats 54 and 56, the jack 99 once again is driven into the extended position whereby the seat returns into the seating mode 96 shown in solid lines, and the conversion mechanism in the relation position is locked by an appropriate locking means. Thereupon the conversion mechanism becomes operational in the manner already described.

By symmetry, the conversion mechanism associated with the trailing seat 97 being situated above the seat, to the contrary of the conversion mechanism associated with the leading seat 96, a jack which is symmetric with the jack 90 enables the trailing seat 97 to assume the passenger relaxation position 97-1. This enabling jack must extend. However, except for the directions of displacement being opposite, where this reversal is due to the mutual symmetry of the two mechanisms, these mechanisms are identical and will not be discussed further.

In one embodiment of the invention to implement rigidity and positional safety, each hinge or slide of the leading or trailing seat is fitted with a controlled locking means whereby said means shall be actuated when the seat is in the seating mode or in the couch mode and shall be de-activated when the conversion mechanism is in motion.

FIG. 10 schematically shows the set of seats of the preceding Figure when having been moved into the mode of the upper and lower couches 96 and 97 respectively. The two mechanisms implementing the relaxation mode are shifted into the neutral position which is locked by appropriate means and the conversion mechanism is then functionally identical with that described in relation to FIGS. 5 and 6.

In one embodiment of the present invention, each seat part assumes the shape of a cushion mounted on a frame or cushion support and is fitted with boreholes to engage in cantilevered manner, on the corresponding spindles, certain linkages and/or the conversion mechanisms. Each spindle which shall be engaged in a borehole of a seat part is fitted with a detachable fastener whereby said seat part shall be mounted in reliable and detachable manner on the linkage or on the conversion mechanism to allow its disassembly for maintenance or cleaning of the conversion system.

In one embodiment of the present invention, each support or bulkhead is configured between two sets of two seats, namely a leading and a trailing seat. The conversion mechanisms associated with each seat of the double set therefore are mounted on the same bulkhead and at the same stationary points.

In one embodiment of the present invention, more than two seats in a column are converted into couches one above the other. For that purpose the bulkhead or support is common to said seats.

Linear actuators or jacks were described above in the form of drive components of the conversion mechanism. In other embodiment modes, rotary drive means are used, which are mounted on the hinges of the linkages and/or of the conversion mechanism.

Presently another conversion mechanism transforming a seat into a couch will be described. In such a conversion mechanism, the conventional environment of the seats is preserved, namely conventional seat access, feasibility of stretching one's legs underneath the leading seat when the conversion system is in the seating mode, such a feature already having been discussed in relation to the first kind of conversion mechanism and in relation to FIGS. 1 through 10.

Said unit consists of at least two convertible seats. It may be installed in compartments having a single or two aisles between the columns of seats forming units.

The conversion mechanism of each unit is situated between the seats without thereby reducing the available passenger space of these relatively conventional seats. Moreover, the fasteners and the stress transmission into the floor of said compartment are also conventional.

The conversion mechanism consists of at least one electric motor and is associated with a manual seat resetting mechanism to make the system of the invention safe, even in case of power failure, in a critical environment such as air transportation.

Another advantage of this kind of conversion mechanism is that, in the couch mode, the seat units are linked to each other and thereby impart maximum strength and rigidity to the system.

Each seat is fitted with a stationary structure similar to the frame of a conventional seat. Furthermore the stationary frame acts as a slide to a displaceable frame driven by the unit's electric motor. The displaceable frame consists of several bars interconnected by hinges. These bars are respectively associated with the various set parts, namely the backrest,
the base,
the leg rest,
the foot guard.

The displaceable frame moves inside the stationary frame along the path defined by the slides and is driven by the conversion mechanism. In the seating mode, the stationary and displaceable frames coincide. In the couch mode, the displaceable frame of the backrest links the upper components of the stationary frame.

Each seat is fitted with a bidirectionally operative conversion mechanism, namely in the upward or downward direction, to move from the seating mode into the couch mode and vice-versa.

As regards the seat configured as an upper couch, the base moves vertically while remaining parallel to its design plane.

The backrest is mechanically constrained by a cam of which the contour implements a progressive tipping into a horizontal position. In this mode, the two backrest ends lock onto hooks situated on the stationary frames of the leading and the trailing seats. These hooks will be unlocked for the descent motion.

The base is driven by the backrest near the pivot. It is mechanically constrained by a mechanism to the ascending slide in such a way that it shall rest horizontal during said ascent. It retains this position when the assembly is in the couch mode. The rest against the stop assures it stays in the cantilevered position.

As regards the lower couch, the motor will drive the system in the opposite direction.

The various components of this kind of conversion mechanism shall now be elucidated in relation to FIGS. 11 through 14.

FIG. 11 shows a unit of two side-by-side seats 110 and 111. It is understood that this configuration is repeated along a column and that as a result each seat is configured in the seating mode as leading or trailing another seat in a column and that the common motion from the seating mode into the couch mode substantially is that already described in relation to FIGS. 1 and 2.

The seat 110 comprises a backrest part 114 and a base part 113 which are mounted on a stationary frame 115 and on legs 116 solidly joined to the compartment's floor and of a conventional design.

The stationary frame 115 bears stops such as the stop 112 receiving the ends of the corresponding components of the displaceable frame of the leading seat when said seat is in the upper couch mode.

Each base 113 and backrest 114 is mounted on its own displaceable frame (not visible in FIG. 11) inside the stationary frame 115 and as a result, due to the electric motor (omitted from FIG. 11) driving the unit of seats 110 and 111, said parts undergo a coordinated vertical and horizontal displacement V1 and H1 respectively as regards the base 113 and a coordinated vertical and horizontal displacement V2 and H2 respectively as regards the backrest 114. The direction of the arrows shown in FIG. 11 relates to a leading seat that shall be converted into an upper couch. This direction will be inverted as regards a trailing seat to be converted into a lower couch.

FIG. 12 is a partly sectional sideview of two consecutive units of seats identical to those of FIG. 11. The leading seat 120 is shown in dashed lines in the seating mode 120-1 and then in solid lines in the upper couch mode 120-2. The trailing seat 121 is shown in dashed lines in the seating mode 121-1 and then in solid lines in the lower couch mode 121-2. The dimensions of the drawing are not to scale of a practical embodiment.

In the couch mode, the end 124 of the displaceably frame of the backrest 125 of the leading seat 120 comes to rest against the stop 123 mounted on the stationary frame 126 of the trailing seat 121.

The displaceable frame 124 also rests against the end of the slide or cam 127 situated on the stationary frame 129 of the seat 120.

The base component A of the leading seat 121 follows an initially descending vertical path V1 parallel to its defining (here the horizontal) plane.

The backrest D of the trailing seat 121 first implements a vertical descent V2 within the stationary frame 126 and then a horizontal motion H2 in order to slide underneath the leading seat 120. Be it noted with respect to this column of seats that the stationary frames fitted with a cam alternate with the stationary frames fitted with a stop. In another embodiment mode, each stationary seat frame comprises one stop and one cam that operate only on one out of two seats in the column.

Being firmly affixed to the base of the backrest, the other seat parts follow the overall conversion motion by means of the drive mechanisms already described in relation to FIGS. 5 and 6.

FIG. 13 shows an embodiment mode of the drive components for the conversion mechanism which is configured between two side-by-side seats of a two-seat unit of the invention.

An electric motor 130 is connected by its output shaft to a speed reducer 131. The speed reducer 131 consists of two symmetrical halves 131a and 131b each assigned to one of the seats and it is fitted with an output pulley on which runs a belt or a cable schematically denoted by the reference 137 and passing within the omitted stationary frame of the corresponding seat. Only one of the two seats shall be discussed immediately below, the other one being identical.

The belt runs on pulleys 134 and 135 near the hinge between the base and the backrest on one hand, and a pulley 139 on the other for the belt return, beyond the excursion of the displaceable frame, the pulleys 134, 135 and 139 being idle on shafts affixed to the stationary frame.

Each (omitted) seat part that must carry out a motion H or V along the path, defined by the slides while driven by the belt 137 in turn driven by the motor 130, is firmly affixed to said belt 137 by a carriage 138 of which a portion is affixed to the belt 137.

In this manner each seat part shall be actuated at its displaceable frame within the stationary one.

FIG. 14 in illustrative manner shows the interactions between the seat parts and the stationary and displaceable frames, further the conversion mechanism for the backrest of each seat, in the upper couch position.

The displaceable frame 140 is shown in its seating mode position 140-1 within the stationary frame 143 and as it moves within the slide 142 on the stationary frame 143 by means of the motor actuation described in relation to the previous Figure into the intermediate positions 140-2 and then 140-3 and lastly into its final position of the couch mode into the position 140-4. The end of the (partly shown) displaceable frame 140 bears a pivot (141) affixed to the omitted toothed belt of the said motor means. Said end moves inside the slide 142 and comes to rest against a tipping cam 144 affixed to the stationary frame 143. To implement this design, the end of the displaceable frame 140 is fitted with an end piece 146 to control the tipping of the backrest into the couch mode when making contact with the tipping cam 144.

The displaceable frame 140 moreover bears a lock 145 allowing locking it in the horizontal position and cooperating with an omitted, corresponding latch fitted on the stationary frame. In this manner, the latch being retracted when the control unit of the conversion system of the invention issues a command, the displaceable frame 140 is able to initiate its ascending or descending motion relative to the stationary frame.

In the preceding description, the distance between consecutive seats or chairs was kept constant. Obviously however said inter-seat distance need not be kept constant along the column. Moreover the distance between two consecutive chairs may be modified in order to match the conversion system of the invention to different classes of seats.

In the preceding description the seats are being converted from a seating mode into a couch mode and vice-versa. But it is clear that the conversion mode, other than that of the seat, may also be one of collapse whereby the seats, following conversion, clear a free space in the compartment before they are returned to the seating mode.

In the preceding description, the conversion system is intended mainly to convert a set of seats which are in the seating mode into the couch mode or into another collapsed mode. It is clear that the system of the invention may be used with a single seat, the other seats of the compartment remaining in the seating mode. The single seat, or a few individual seats that were converted into couches, then may be used as litters or receive a litter in particular for purposes of medical evacuation.

What is claimed is:

1. A system for converting a seat into a couch, the seat including a base and a backrest interconnected by a linkage thereby enabling the seat to be moveable between a seat mode, when the base and backrest assume a first relative angular position, and a couch mode, when the base and backrest assume a second relative angular position, said system comprising:

a first rigid frame rotatable about a first stationary point, said first fame comprising first and second levers each having two ends one of which is pivotably connected to said first stationary point, the other ends of said levers being adapted to be attached to spaced attaching points of the seat;

the frame and levers being arranged so the relative position of said levers remains unchanged when said first frame rotates to move the seat between the seat mode and the couch mode;

said first lever having an elbow-shape and a knuckle portion, said first frame having a substantially quadrangular shape.

2. The system of claim 1, further comprising a drive component connected to said knuckle portion via a hinge for driving said first frame to cause the first frame to rotate about said first stationary point.

3. A system for converting a seat into a couch, the seat including a base and a backrest interconnected by a linkage thereby enabling the seat to be moveable between a seat mode, when the base and backrest assume a first relative angular position, and a couch mode, when the base and backrest assume a second relative angular position, said system comprising:

a first rigid frame rotatable about a first stationary point, said first frame comprising first and second levers each having two ends one of which is pivotably connected to said first stationary point, the other ends of said levers being adapted to be attached to spaced attaching points of the seat;

the frame and levers being arranged so the relative position of said levers remains unchanged when said first frame rotates to move the seat between the seat mode and the couch mode;

an extendible and retractable drive component connected to said first frame for driving said first frame to cause the frame to rotate about said first stationary point;

a second rigid frame rotatable about a second stationary point, said second frame comprising third and fourth levers each having two ends one of which is pivotably connected to said second stationary point, the other ends of said third and fourth levers being adapted to be attached to spaced attaching points of a trailing seat which is substantially identical to and disposed consecutively behind the seat in the seat mode;

the second frame and third and fourth levers being arranged so the relative position of said third and fourth levers remains unchanged when said second frame rotates to convert the trailing seat into a couch and vice versa; and said drive component being connected for simultaneously driving said first and second frames to cause the first and second frames to rotate about said respective first and second stationary points;

said frames and said respective stationary points being arranged so that the trailing seat in the couch mode is disposed below the seat that is to be converted into the couch.

4. A system for converting a seat into a couch, the seat including a base and a backrest interconnected by a linkage they enabling the seat to be moveable between a seat mode, when the base and backrest assume a first relative angular position, and a couch mode, when the base and backrest assume a second relative angular position, said system comprising:

a first rigid frame rotatable about a first stationary point, said first frame comprising first and second levers each having two ends one of which is pivotably connected to said first stationary point, the other ends of said levers being adapted to be attached to spaced attaching points of the seat;

the frame and levers being arranged so the relative position of said levers remains unchanged when said first frame rotates to move the seat between the seat mode and the couch mode;

an extendible and retractable drive component connected to said first frame for driving said first frame to cause the frame to rotate about said fit stationary point;

a second rigid frame rotatable about a second stationary point, said second frame comprising third and fourth levers each having two ends one of which is pivotably connected to said second stationary point, the other ends of said third and fourth levers being adapted to be attached to spaced attaching points of a trailing seat which is substantially identical to and disposed consecutively behind the seat in the seat mode;

the second frame and third and fourth levers being arranged so the relative position of said third and fourth levers remains unchanged when said second frame rotates to convert the trailing seat into a couch and vice versa; and said drive component being connected for simultaneously driving said first and second frames to cause the first and second frames to rotate about said respective first and second stationary points;

said first and second frames being connected by a connecting lever for connecting said drive component and said second frame.

5. A system for converting a seat into a couch, the seat including a base and a backrest interconnected by a linkage thereby enabling the seat to be moveable between a seat mode, when the base and backrest assume a first relative angular position, and a couch mode, when the base and backrest assume a second relative angular position, said system comprising:

a first rigid frame rotatable about a first stationary point, said first frame comprising first and second levers each having two ends one of which is pivotably connected to said first stationary point, the other ends of said levers being adapted to be attached to spaced attaching points of the seat;

the frame and levers being arranged so the relative position of said levers remains unchanged when said first frame rotates to move the seat between the seat mode and the couch mode;

an extendible and retractable drive component connected to said first frame for driving said first frame to cause the frame to rotate about said first stationary point; and a gear rack arranged to be driven by rotational movement of said first frame, said gear rack being adapted to guide a frame of a trailing seat which is substantially identical to and disposed, in the seat mode, consecutively behind the seat that is to be converted into the couch, the drive component being arranged to transmit a driving force to said gear rack for moving the trailing seat into the couch mode where the trailing seat is disposed below the seat.

6. The system of claim 5, further comprising a spindle positioned at said first stationary point, at least one gear arranged to be driven by said spindle and engaged with said gear rack.

7. In combination, at least one seat including a base and a backrest interconnected by a linkage thereby enabling said seat to be moveable between a seat mode, when the base and backrest assume a first relative angular position, and a couch mode, when the base and backrest assume a second relative angular position; and a system for moving said seat between said modes, said system comprising:

a first rigid frame rotatable about a first stationary point, said first frame comprising first and second levers each having two ends one of which is pivotably connected to said first stationary point, the other ends of said levers being attached to spaced attaching points of said seat;

the frame and levers being arranged so the relative position of said levers remains unchanged when said first frame rotates to move said seat between the seat mode and the couch mode;

said first lever having an elbow shape and a knuckle portion, said first frame having a substantially quadrangular shape; and an extendible and retractable drive component connected to said knuckle portion via a hinge for rotatably driving said first frame about said first stationary point.

8. The combination of claim 7, further comprising a trailing seat which is substantially identical to and disposed, in the seat mode, consecutively behind said seat that is to be converted into the couch;

a second rigid frame rotatable about a second stationary point, said second frame comprising third and fourth levers each having two ends one of which is pivotably connected to said second stationary point, the other ends of said third and fourth levers being attached to spaced attaching points of said trailing seat;

the second frame and third and fourth levers being arranged so the relative position of said third and fourth levers remains unchanged when said second frame rotates to convert the trailing seat into a couch and vice versa;

said drive component being connected for simultaneously driving said first and second frames to cause the first and second frames to rotate about said respective first and second stationary points; and said frames and said respective stationary points being arranged so that the trailing seat, in the couch mode, is disposed below the seat that is to be converted into the couch.

9. The combination of claim 7, further comprising a trailing seat which is substantially identical to and disposed, in said seat mode, consecutively behind said seat that is to be converted into the couch;

a gear rack adapted to be driven by a gear connected to a spindle disposed at said first stationary point, said gear rack being arranged for guiding a portion of a frame of said trailing seat along said gear rack; and the drive component being arranged to transmit a driving force to said gear rack for moving the trailing seat into the couch mode where the trailing seat is disposed below the seat.

10. A system or converting a plurality of seats into couches, each of the seats including a base and a backrest interconnected by a linkage thereby enabling said seat to be moveable between a seat mode, when the base and backrest assume a first relative angular position, and a couch mode, when the base and backrest assume a second relative angular position, said system comprising:

a support for each seat; and a common conversion mechanism placed between and for moving two of the seats, which are disposed side-by-side, between the seat mode and the couch mode, so that two of the seats, which are disposed one behind the other in the seat mode, are moveable into the couch mode with one seat below the other, said system comprising, for each seat:

(a) a plurality of displaceable frames each corresponding to one of the base and the backrest of said seat;

(b) a stationary frame on which said displaceable frames are moveably mounted; and (c) at least one drive component for driving said displaceable frames to move relative to said stationary frame, so that said displaceable frames, and hence said seat, are moveable between the seat mode and the couch mode;

at least one of said displaceable frames being reversibly slidable along a predetermined path in said stationary frame so that a leading seat of the two of the seats, which are disposed one behind the other in the seat mode, can ascend into an upper couch while a trailing seat of said two seats can descend into a lower couch underneath said upper couch; and said stationary frame being equipped with at least one of (i) a stop for supporting an end of the base or the backrest of the seat being converted into the upper couch, and (ii) a tipping cam for the displaceable frame corresponding to the backrest of the seat being converted into the upper couch, whereby a column of said upper couches disposed in series constitutes a rigid structure.

* * * * *